United States Patent
Wilson et al.

(10) Patent No.: US 9,378,014 B2
(45) Date of Patent: Jun. 28, 2016

(54) METHOD AND APPARATUS FOR PORTING SOURCE CODE

(71) Applicant: FUJITSU LIMITED, Kawasaki-shi, Kanagawa (JP)

(72) Inventors: Nicholas Wilson, West Drayton (GB); Jim Enright, Slough (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/263,081

(22) Filed: Apr. 28, 2014

(65) Prior Publication Data

US 2015/0033202 A1 Jan. 29, 2015

(30) Foreign Application Priority Data

Jul. 26, 2013 (EP) .................................... 13178246

(51) Int. Cl.
 *G06F 9/44* (2006.01)
 *G06F 9/45* (2006.01)
(52) U.S. Cl.
 CPC .. *G06F 8/76* (2013.01); *G06F 8/30* (2013.01); *G06F 8/36* (2013.01); *G06F 8/41* (2013.01); *G06F 8/43* (2013.01); *G06F 8/70* (2013.01)
(58) Field of Classification Search
 CPC ............................................... G06F 8/30–8/77
 See application file for complete search history.

(56) References Cited

U.S. PATENT DOCUMENTS

| 5,450,567 | A | * | 9/1995 | Mori | .......................... | G06F 8/70 703/20 |
| 5,905,892 | A | * | 5/1999 | Nielsen | ..................... | G06F 8/30 714/35 |
| 8,713,554 | B1 | * | 4/2014 | Chopra et al. | ................. | 717/168 |
| 8,924,935 | B1 | * | 12/2014 | Chopra et al. | ................. | 717/124 |
| 2002/0112200 | A1 | | 8/2002 | Hines | | |
| 2004/0103406 | A1 | | 5/2004 | Patel | | |
| 2005/0262472 | A1 | * | 11/2005 | Wood | ..................... | G06Q 10/06 717/102 |
| 2006/0156286 | A1 | * | 7/2006 | Morgan et al. | ................. | 717/124 |

(Continued)

OTHER PUBLICATIONS

Moser, Raimund, et al., "A Comparative Analysis of the Efficiency of Change Metrics and Static Code Attributes for Defect Prediction", 2008, pp. 181-190.*

(Continued)

*Primary Examiner* — Thuy Dao
*Assistant Examiner* — Christopher Franco
(74) *Attorney, Agent, or Firm* — Staas & Halsey LLP

(57) ABSTRACT

A method of porting source code for use in a runtime environment including a tool chain with a compiler for building the source code, in which the method comprises obtaining a source code fragment associated with a build error during the source code build in the runtime environment; creating a signature of the source code fragment; automatically comparing the signature with entries in an error database constructed from a history of previous build errors in the runtime environment and their fixes in the form of source code and/or tool chain modifications; using the comparison to find one or more similar previous build errors to the build error and thus to identify one or more of the source code and/or tool chain modifications as candidate solutions to the build error; compiling the source code with each of the candidate source code and/or tool chain modifications in turn until the source code compiles without reproducing the build error; and storing the build error in the error database and storing the modification with which the source code compiles without reproducing the build error as its fix.

15 Claims, 14 Drawing Sheets

(56) References Cited

U.S. PATENT DOCUMENTS

| | | |
|---|---|---|
| 2008/0313602 A1 | 12/2008 | Tillmann et al. |
| 2010/0325619 A1* | 12/2010 | Song ................... G06F 8/43 717/143 |
| 2012/0180024 A1* | 7/2012 | Gonzalez ............. G06F 8/71 717/109 |
| 2012/0297363 A1* | 11/2012 | Perisic ................. G06F 8/71 717/122 |
| 2013/0047140 A1* | 2/2013 | Shann ............. G06F 11/3664 717/128 |
| 2013/0047141 A1 | 2/2013 | Shann et al. |
| 2013/0159989 A1* | 6/2013 | Deckert ............... G06F 8/61 717/172 |
| 2014/0282439 A1* | 9/2014 | Kannan ............... G06F 8/76 717/140 |
| 2014/0317606 A1* | 10/2014 | Gataullin .......... G06F 11/3636 717/128 |

OTHER PUBLICATIONS

Park, Jihun, et al., "An Empirical Study of Supplementary Bug Fixes", 2012, pp. 40-49.*
Aberdour, Mark, "Achieving Quality in Open Source Software", 2007, 58-64.*
Gomes, Ivo, et al., "An overview on the Static Code Analysis approach in Software Development", 2009, pp. 1-16.*
Breckel, Alexander, "Error Mining: Bug Detection through Comparison with Large Code Databases", 2012, pp. 175-178.*
Srikanth, Hema, et al., "System Test Case Prioritization of New and Regression Test Cases", 2005, pp. 64-73.*
Extended European Search Report mailed Nov. 8, 2013 in corresponding European Patent Application No. 13178246.8.

* cited by examiner

METHOD AND APPARATUS FOR PORTING SOURCE CODE

CROSS-REFERENCE TO RELATED APPLICATIONS

This application claims the benefit of European Application No. 13178246.8, filed Jul. 26, 2013, the disclosure of which is incorporated herein by reference.

BACKGROUND

1. Field

The present invention relates to a method and apparatus for porting source code. Porting is the process of adapting software (such as application software or libraries) so that an executable program or other user-ready software product can be created for a computing context that is different from the one for which it was originally designed. Thus software may be ported to a different platform (hardware architecture and set up), a different system (which is used herein to refer to the platform plus the operating system), or a different run time environment (which is used herein to include the platform and system, compilers, library and other settings in the user environment).

2. Description of the Related Art

Software can be referred to as portable when it runs on a wide variety of different computing environments or when the cost of porting it to a new environment is less than the cost of writing it from scratch. The lower the cost of porting software, relative to its implementation cost, the more portable that software is said to be.

The invention is primarily targeted at High Performance Computing (HPC) applications, libraries and tools where it is common to port the code to a wide range of supercomputing platforms which have differing architectures and software stacks forming the tool chain of programming tools (compiler, parallel libraries etc.) used to create the executable program or other product. However, it is also more widely applicable, for example in porting applications from other fields and to other platforms Some areas where the invention is valuable are in the porting of applications to new low-power and bespoke supercomputing systems that are becoming available. These systems are built from low-power processors (e.g. ARM), many-core processors (for example Intel's MIC architecture) or processors specifically designed for the HPC market (Fujitsu's SPARC64 IXfx). Porting applications to these platforms is a big challenge for those coming from the commodity x86-based family of systems.

FIG. 1 illustrates the steps required when porting an application, library or other piece of software to a new architecture; possibly with a different set of compilers, parallel programming libraries (such as the MPI library) or other system-specific tools. In this context, the term library may be taken to include a collection of implementations of behavior with a well-defined interface by which the behaviour is invoked.

In step P10 the source code is obtained and in step P20 it is unpacked and subsequently in step P30 prepared for compilation. Step P40 compiles the code and then if there are compile errors these are fixed in step P50 and the code is compiled again. Otherwise, if there are no compilation errors, quality assurance (QA) testing takes place in step P60 and if the tests are passed the code is packaged in step P70, installed in step P80 and documented in step P90.

If the QA tests are failed then there is debugging in step P100 which leads to further preparation for compilation in step P30.

From this explanation, we see that there is an iterative step during the compilation stage. Note that the 'compile' stage here represents all the (build) steps for a piece of software to be considered ready for QA testing and installation—e.g. compiling and packaging of object files for libraries or compiling and linking for applications. If any errors occur at this point it is necessary to branch off from the normal porting flow and fix these errors.

FIG. 2 shows in more detail the iterative process involved in fixing compile-time errors. When errors occur, usually a descriptive error message is output from the compiler. The user, application developer or system administrator then (manually) analyses these errors to identify the type of fix required in order to solve them. Examples of errors that may occur include an incorrect or missing compiler option, an incompatibility in the source code due to non-standard code or incorrect pre-processor directives or dependent libraries and utilities that are missing. Once a fix for the error is applied the code is recompiled. Further iterations of the process take place if another compile-time error occurs.

The steps P20 to P60 already described with respect to FIG. 1 are shown along with an expansion of step P50 for fixing the compiled-time error. The errors are analyzed in step P51 and according to the type of fix are fixed in step P52, P53 or P54 for example.

Step P53 provides a fix for a missing library or other utility, step P53 may be an incorrect or missing compiler option and step P54 is an incompatibility in the source code which requires a source code "patch" or modification.

Currently the process described above is primarily a manual one, requiring substantial time and effort from the person porting the code or from the system development team depending on the nature of the errors. Some tools exist which can help in the porting effort, for example Lint which flags suspicious and non-portable code constructs; the Intel Static Security Analysis tool which finds porting and security errors and the Bauhaus project which detects cloned and dead source code. A number of technical reports, websites and blogs are also available on how to port to a particular architecture. However, these solutions automate only one particular area or are offline guides which still require extensive work on the part of the individual porting the software.

It is thus desirable to provide a tool which automates the correction of build errors during software porting.

SUMMARY

Additional aspects and/or advantages will be set forth in part in the description which follows and, in part, will be apparent from the description, or may be learned by practice of the invention.

According to an embodiment of a first aspect of the invention there is provided a method of porting source code for use in a runtime environment including a tool chain with a compiler for building the source code, the method comprising obtaining a source code fragment associated with a build error during the source code build in the environment; creating a signature of the source code fragment; automatically comparing the signature with entries in an error database constructed from a history of previous build errors in the runtime environment and their fixes in the form of source code and/or tool chain modifications; using the comparison to find one or more similar previous build errors to the build error and thus to identify one or more of the source code and/or tool chain modifications as candidate solutions to the build error; compiling the source code with each of the candidate source code and/or tool chain modifications in turn until the source code compiles without reproducing the build error; and storing the build error in the error database and storing the modification with which the source code compiles without reproducing the build error as its fix.

Various embodiments of the invention, often referred to as an Automatic Code Correction Engine (ACCE) allow source code to be ported to a new platform and/or new run time environment by use of automatic correction of build errors related to some aspect of the tool chain or to the source code itself. This porting may include a move to new tool chain elements, such as a new compiler.] The inventors have come to the realization that there is a vast amount of data from failed compile runs and the subsequent fixes applied which could be used across different porting projects to identify and correct the sources of errors without the need for user input. An aim of the Automatic Code Correction Engine is to provide a tool capable of automatically building an application or library on an architecture on which it has not been tested before, or for example for a given compiler/MPI/other library settings (that is, in a runtime environment that differs in some respect from any previous runtime application). It can take an application from the point at which it produces a build error, automatically analyze the errors and apply appropriate fixes. The Automatic Code Correction Engine may be capable of performing "deep code inspection" on the source code by use of a source code signature. This can additionally be used to identify areas where the code quality can be improved to give more portable and standard-compliant source code. By automating the process of porting-error recovery the time, effort and domain-specific knowledge required from users and system administrators can be reduced significantly.

Invention embodiments address the issues described above in the prior art by automating the process of analyzing and correcting porting errors. This is combined with a deep code source analysis. A system-wide learning database may be used to store build errors and their subsequent fixes and automatically fix the errors without any user input.

The skilled person will appreciate that in order to solve a build error during compilation or during another build stage, either the source code may be modified or there may be a modification to the tool chain. In either case, the same fix may be suitable for re-use where there is some similarity with future build errors and this forms the basis for the present invention.

Reference herein to a source code fragment is to a part of the code associated with a build error, which may form any percentage of the full code length, but is usually less than the full code length. The source code fragment has a signature which may be viewed as a short-form representation, or as a contracted expression of the source code around the error/section hindering compilation. The signature may be created by any suitable method for representing the source code. Preferably, the ACCE and method of invention embodiments are not language specific.

In some invention embodiments, the signature of the source code fragment is created by converting the source code fragment to a non-language specific intermediate representation, and then creating a signature from the intermediate representation, preferably a hash signature. This allows source code in a different language to benefit from a fix (or solution) applied in an original language.

As the skilled person will be aware, a hash signature is the result of a hash function which may be an algorithm taking a block of data and returning a fixed-size bit string such that any change to the data will change the hash value.

Advantageously, the signature of the source code fragment includes a scope level signature for each of a plurality of scope levels around the error.

The use of scope herein includes entity scope (that is variable objects, variables, objects, erase, functions etc) in a program but within the context of the error. In general terms, a scope is the context within a computer program in which an identifier is in effect and can be resolved to an entity (that is, when the entity is visible). Thus one scope level may be where the error occurs, the next scope level may be the loop, a further scope level may be the procedure so on. There is a signature for each scope level generated from the unambiguous representation of the code. In addition to this, there is another signature for the last scope level that uses the original source code; this is the context hash. The context hash allows for solution of errors where the exact same source file has been seen and corrected before.

In one embodiment, each scope level around the source code fragment up to the entire program scope level has a scope level signature.

The error database is an important concept for the invention embodiments and thus an important component for the Automatic Code Correction. The error database is a learning database and preferably an initial learning phase is executed, allowing a training set of build errors and their known solutions to be established in the database. The learning phase may be automated, or semi-automated or manual.

For example, when porting an application to a new system, a training code suite may be run automatically, presenting codes with known errors and known solutions.

According to invention embodiments, once candidate modifications have been identified, they are employed in turn during compilation until the source code compiles without reproducing the build error. The candidate solutions may be tried in any order, for example in order of identification or in order of degree of modification involved in the possible fix. In some embodiments, candidate solutions are prioritized according to an assessment of the effectiveness of the fix in the current run time environment and/or relevancy of the error.

For example the effectiveness of the fix may be based on a score which is implemented each time the fix is used successfully.

Additionally or alternatively, the relevancy of the error may be based on the degree to which the signature in the previous build error matches the signature of the source code fragment. The matching process may be based on a single signature or on some or all of the scope level signatures previously mentioned.

One advantage of some invention embodiments is that the error database can store errors corresponding to different configurations of the hardware and software environment which the application or other source code runs. This allows use of previous errors from other environments to help solve current errors.

Thus the error database stores build errors not only from source code previously run with a slightly different tool chain/software stack but also from different platforms and even from different systems and hardware architectures (although in this latter case those build errors are expected to be introduced using the initial learning phase previously mentioned). The error database can store source code from different applications and also source code from the same application as the source code being currently ported, with the attendant higher likelihood in many cases that the relevant fix will be applicable again in the same application.

The error database can include any suitable build error fields which are useful in identifying the errors and comparing them with other errors. For example, the build error fields can include any or all of the error message, the signature, and error classification, run time environment details (which may be hardware and/or software details) and application details.

Previous aspects have concentrated on comparison of a current build error with previously fixed build errors using a signature. However, another aspect refers to use of error classification and/or other error details for comparison between a build error and previous build errors. Any or all of the build error fields mentioned above may be used for comparison with the build error currently being processed. In one preferred embodiment, various fields are used in a cumulative filtering process, preferably with the error message classification as a first filter.

Thus according to an embodiment of a further aspect of the invention there is provided a method of porting source code for use in a runtime environment including a tool chain with a compiler for building the source code, the method comprising obtaining an error message and a source code fragment associated with a build error during the source code build in the runtime environment; classifying the error message; automatically comparing the error message classification with entries in an error database constructed from a history of previous build errors in the runtime environment and their fixes in the form of source code and/or tool chain modifications; using the comparison to find one or more similar previous build errors to the build error and thus to identify one or more of the source code and/or tool chain modifications as candidate solutions to the build error; compiling the source code with each of the candidate source code and/or tool chain modifications in turn until the source code compiles without reproducing the build error; and storing the build error in the error database and storing the modification with which the source code compiles without reproducing the build error as its fix.

This aspect of the invention may be combined with any of the features and sub-features of the other aspects unless they are incompatible.

In many embodiments, both methods of comparing the current build error with previous build errors in the error database may be available. In one embodiment the comparison with respect to the error message classification takes place initially and the comparison using the signature only takes place if no candidate modifications are found using the classification comparison (or if no candidate modifications are successful). Alternatively, the comparison by classification and comparison by signature may take place in parallel or the comparison by signature may even take place initially, with the comparison by classification only taking place if the signature comparison method fails, in the same way as explained above for the other order of comparison.

According to an embodiment of a still further aspect of the invention there is provided a method of porting source code for use in a runtime environment including a tool chain with a compiler for building the source code, the method comprising obtaining an error message and a source code fragment associated with a build error during the source code build in the environment; classifying the error message and creating a signature of the source code fragment; automatically comparing the error message classification and/or the signature with entries in an error database constructed from a history of previous build errors in the runtime environment and their fixes in the form of source code and/or tool chain modifications; using the comparison to find one or more similar previous build errors to the build error and thus to identify one or more of the source code and/or tool chain modifications as candidate solutions to the build error; compiling the source code with each of the candidate source code and/or tool chain modifications in turn until the source code compiles without reproducing the build error; and storing the build error in the error database and storing the modification with which the source code compiles without reproducing the build error as its fix.

Preferred embodiments including comparison by signature according to the first aspect of the invention comprise obtaining an error message when the source code fragment is obtained, classifying the error message when the signature of the source code fragment is created; and automatically comparing the error message classification with the entries in the error database, before comparison of the signature with the entries in the database. In such embodiments, the signature comparison may only be carried out if the classification comparison does not yield any suitable modifications.

Any appropriate method of error classification may be used in any aspect of the invention. For example in some embodiments, error classes are divided so as to identify and separate pre-process, compile-time and link-time errors, preferably with a further subdivision as to the type of error.

The error class may be assigned based on the error message, source code analysis and any error code or diagnostic message provided.

In the case in which candidate solutions are prioritized according to relevancy of the error, the relevancy of the error may be based on the degree that the database fields of the similar previous build error match the build error. In this case, the error class may be given a higher weighting in assessing the relevancy than other fields, one or more other database field may be given a higher weighting or all the database fields may have equal weight.

The comparison of the signature may take place in any suitable fashion. However, as noted above, fixes for the same application may have a greater chance of success and therefore in one embodiment, entries in the error database for previous build errors for the same application as the source code are compared with the signature first and if no fixes (or no candidate modifications) are found, entries in the error database or previous build errors from any other application are compared with the signature.

This methodology can be expanded so that build errors for more similar run time environments to the current run time environment are compared first, before less similar run time environments.

According to an apparatus aspect of the present invention there is provided an apparatus arranged to correct errors in porting source code for use with a new runtime environment including a tool chain with a compiler for building the source code, the apparatus comprising an input arranged to obtain a source code fragment associated with a build error during the source code build in the environment; a signature creator arranged to create a signature of the source code fragment; an error database constructed from a history of previous build errors in the environment and their fixes in the form of source code and/or software configuration modifications; a comparator arranged to automatically compare the source code signature with entries in the error database; an identifier arranged to use the comparison to find one or more similar previous build errors to the build error and thus to identify one or more of the source code and/or software configuration modifications as candidate solutions to the build error; and a loop inputter arranged to allow compilation of the source code with each of the identified source code and/or software configuration modifications in turn until the source code compiles without reproducing the build error; and a database updater arranged to store the build error in the error database, and the modification with which the source code compiles without reproducing the build error as its fix.

The apparatus may include a classifier arranged to classify an error message associated with the build error and other components of the apparatus mirroring previously described method sub-features.

According to an advantageous development of this aspect the database may comprise a system table storing information about the runtime environment, an application table storing details about application codes built on the platform, a code fragment table storing code fragments and an indication of whether they can be successfully built and an error table storing the previous build errors.

According to a further aspect there is provided a program which when loaded onto a computing system configures the system to provide the apparatus as previously described. In another definition, there is provided a computer program which when executed carries out a method of porting source code according to the previous description.

Features and sub-features of any of the different aspects of the invention may be freely combined. For example, preferred embodiments of the apparatus (or engine or computer system) may be configured to incorporate functionality corresponding to one or more preferred features of one or more of the method aspects.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Each processor may have one or more cores.

Processors suitable for the execution of a computer program include, by way of example, both general and special purpose microprocessors, and any one or more processors of any kind of digital or biological computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
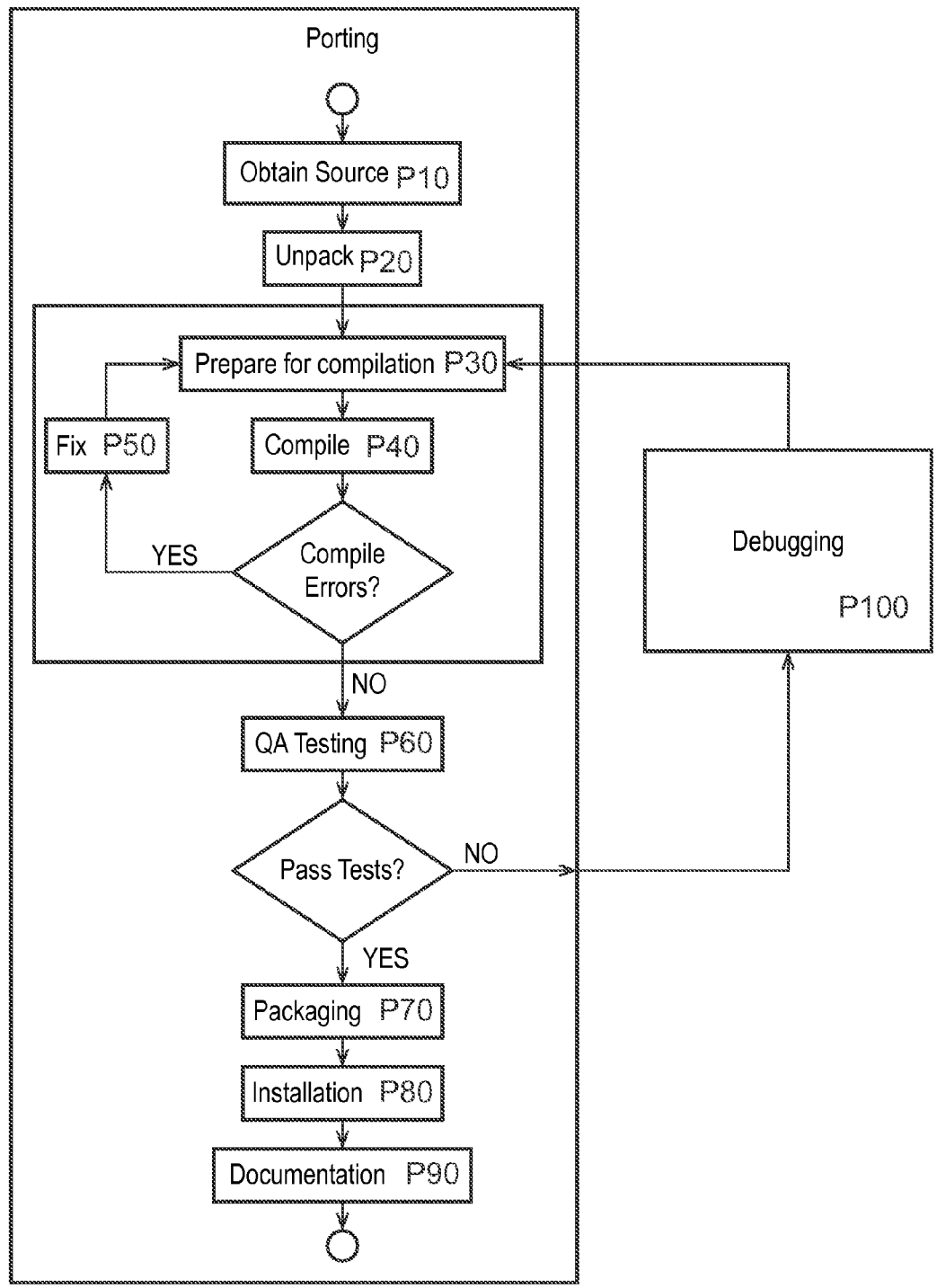
FIG. 1 (described above) is a flowchart showing steps involved when porting software to a new architecture.
Figure 2:
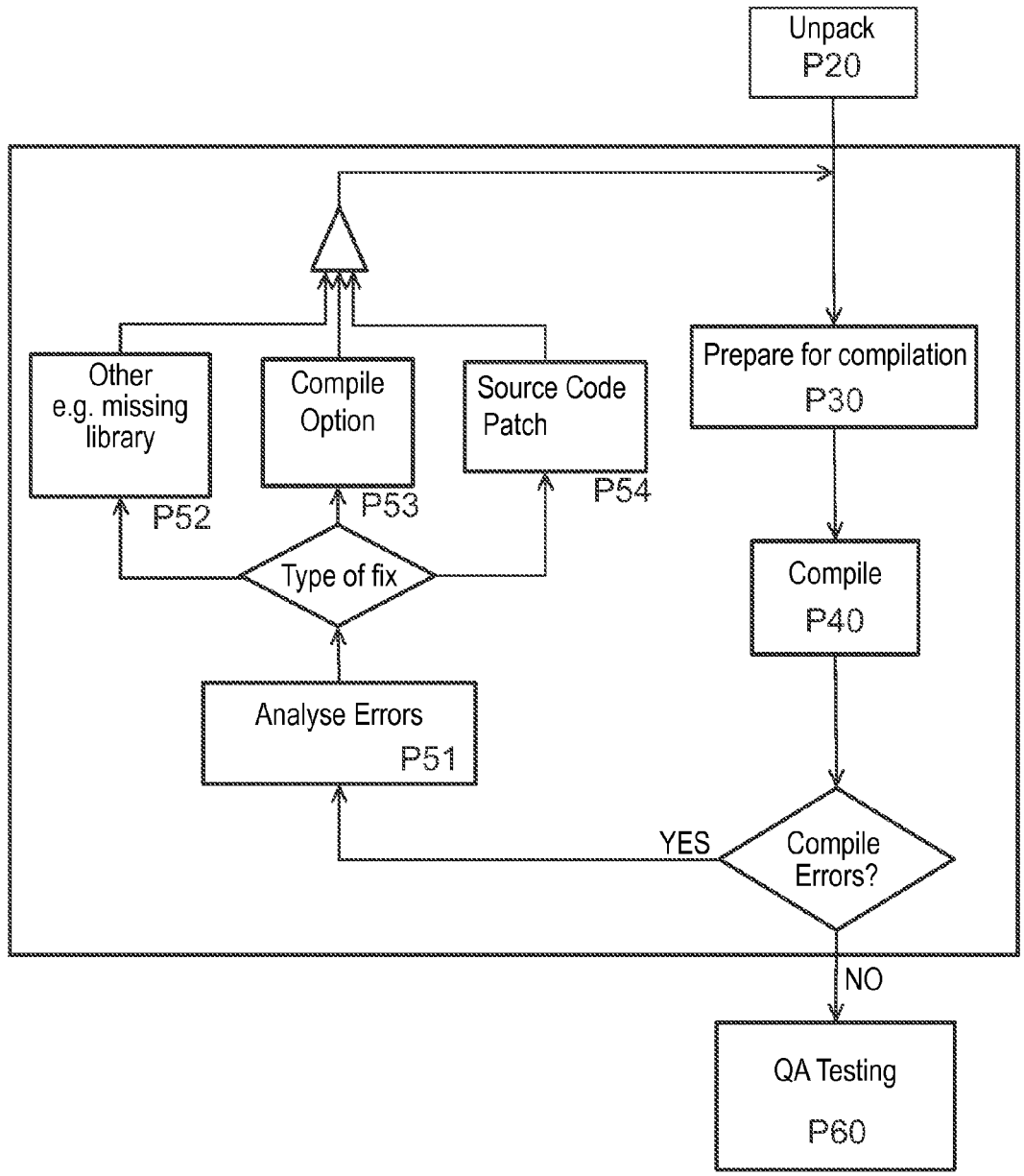
FIG. 2 (described above) is a flowchart showing steps required when dealing with compile-time error.

Reference will now be made in detail to the embodiments, examples of which are illustrated in the accompanying drawings, wherein like reference numerals refer to the like elements throughout. The embodiments are described below to explain the present invention by referring to the figures.

Invention embodiments describe a methodology for correcting compile errors, link errors or pre-processor build errors by solution of the same or a similar error identified using automatic deep-code inspection (signature comparison) from a learning database. Additionally, the system can be tightly integrated with the tool chain including compilers on the computing system to provide enhanced error correction and use of libraries optimized for the computing system.

In general, the tool/engine described in the following works by searching a database of errors and solutions to resolve build errors encountered during the porting of an application to a computing system.

If no direct solution to the error is found the tool can attempt to solve the error by automatically adapting a similar solution from the same application and/or with the same hardware and software environment.

The database may be automatically populated using a training set of errors and known solutions. The training set can be continuously updated with errors seen from new applications so that these can be used when moving to a new system.

Pre-process build errors can be resolved by performing pre-processor flag analysis and inspection combined with knowledge from the database.

Compile errors related to missing or incorrect flags can be resolved because invention embodiments can capture knowledge of the compiler available on a system. This is learned during a training phase of the database and continuously updated during the tools use.

Invention embodiments use a deep code inspection to analyze source code fragments across different applications to identify inconsistencies in an application which is encountering build errors. The deep code inspection preferably uses signatures, but alternatives would be a line-for-line or byte-wise comparison of the intermediate representation.

When moving to a new system, the ever increasing training set can be run on the new system and the learning database of solutions can be automatically adapted to the new system. The database and tool is then able to resolve application build errors already seen on other systems on this new system.

Figure 3A:
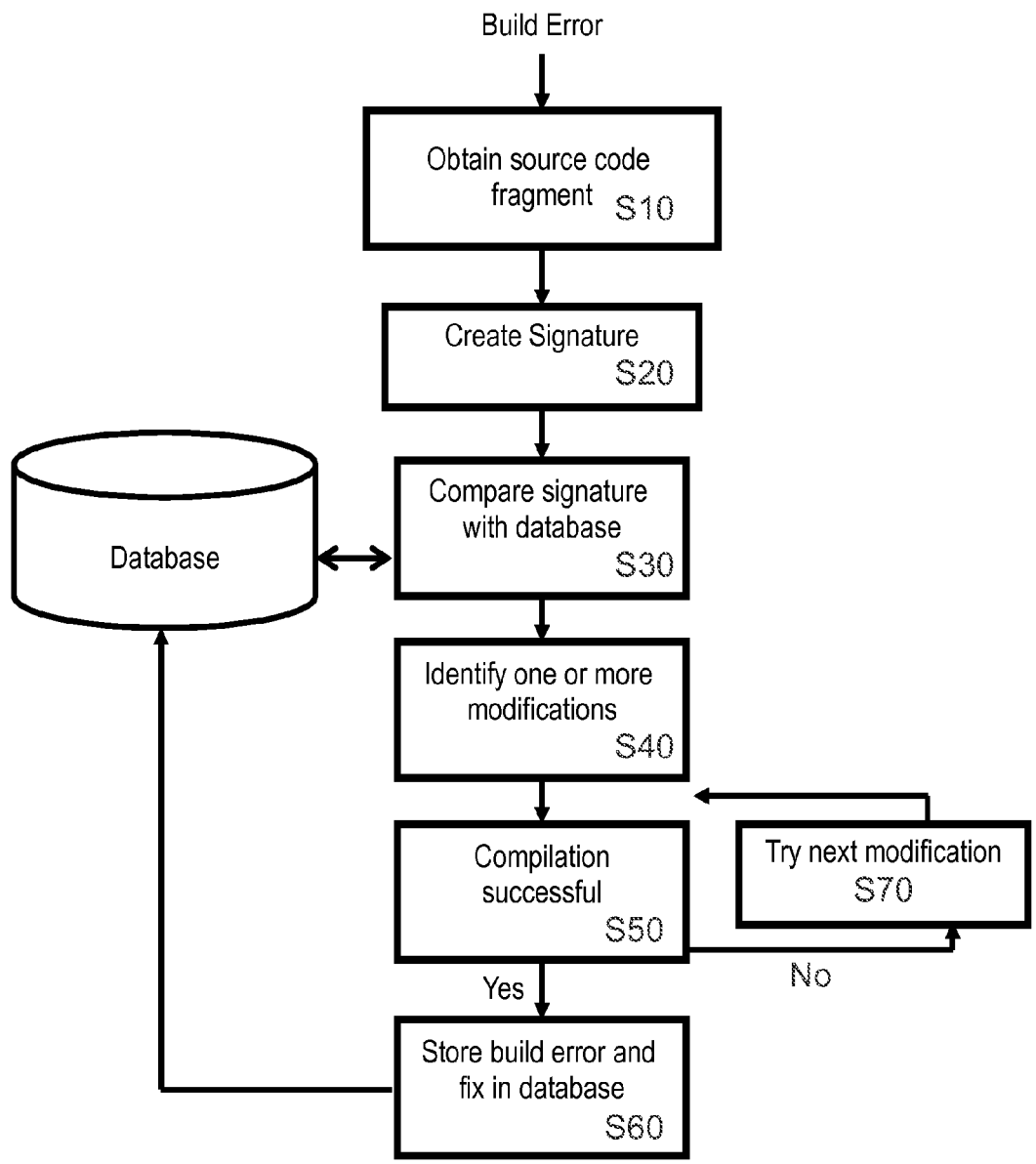
FIG. 3A is a flow chart of an invention embodiment.

FIG. 3A is an illustration of invention embodiments which starts with a build error. In step S10 a source code fragment is obtained and in step S20 a signature thereof is created. In step S30 the signature is compared with an error database (for example with signatures of previous build errors in the error database). In step S40 one or more modifications are identified which might solve the build error. In step S50 the source code is compiled and if the compilation is successful the build error and the fix applied are stored in the database in step S60. If the compilation is not successful, the next modification is tried in step S70. For simplicity, the flowchart does not show abortion of the process and manual modification when no successful modification is found.

Figure 3B:
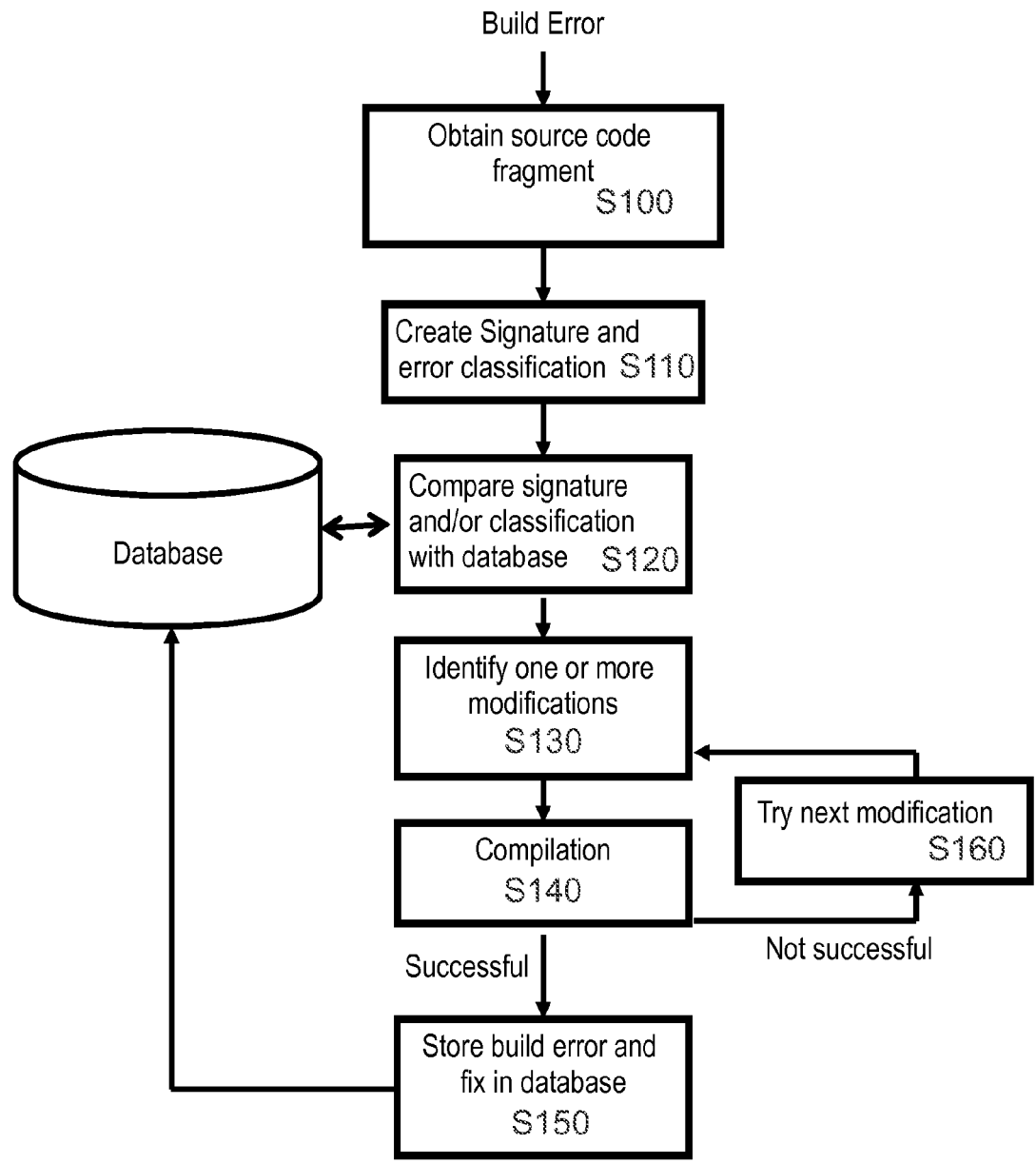
FIG. 3B is a flow chart of another invention embodiment.

FIG. 3B shows a flowchart in which both the signature and an error classification are used for comparison with the error database. In step S100 the source code fragment is obtained. In step S110 the signature is created and the error is classified. In step S120 the error classification and/or signature is compared with previous build errors in. Thus the process continues in step S130 with one or more modifications being identified. The different modifications are applied and the code compiled iteratively in compilation step S140 and step S160 in the event of failure of compilation. If there is successful compilation build error and the modification are stored in the database in step S150.

Of course these are only two of many possible methods of automatic comparison and modification according to invention embodiments.

Figure 4:
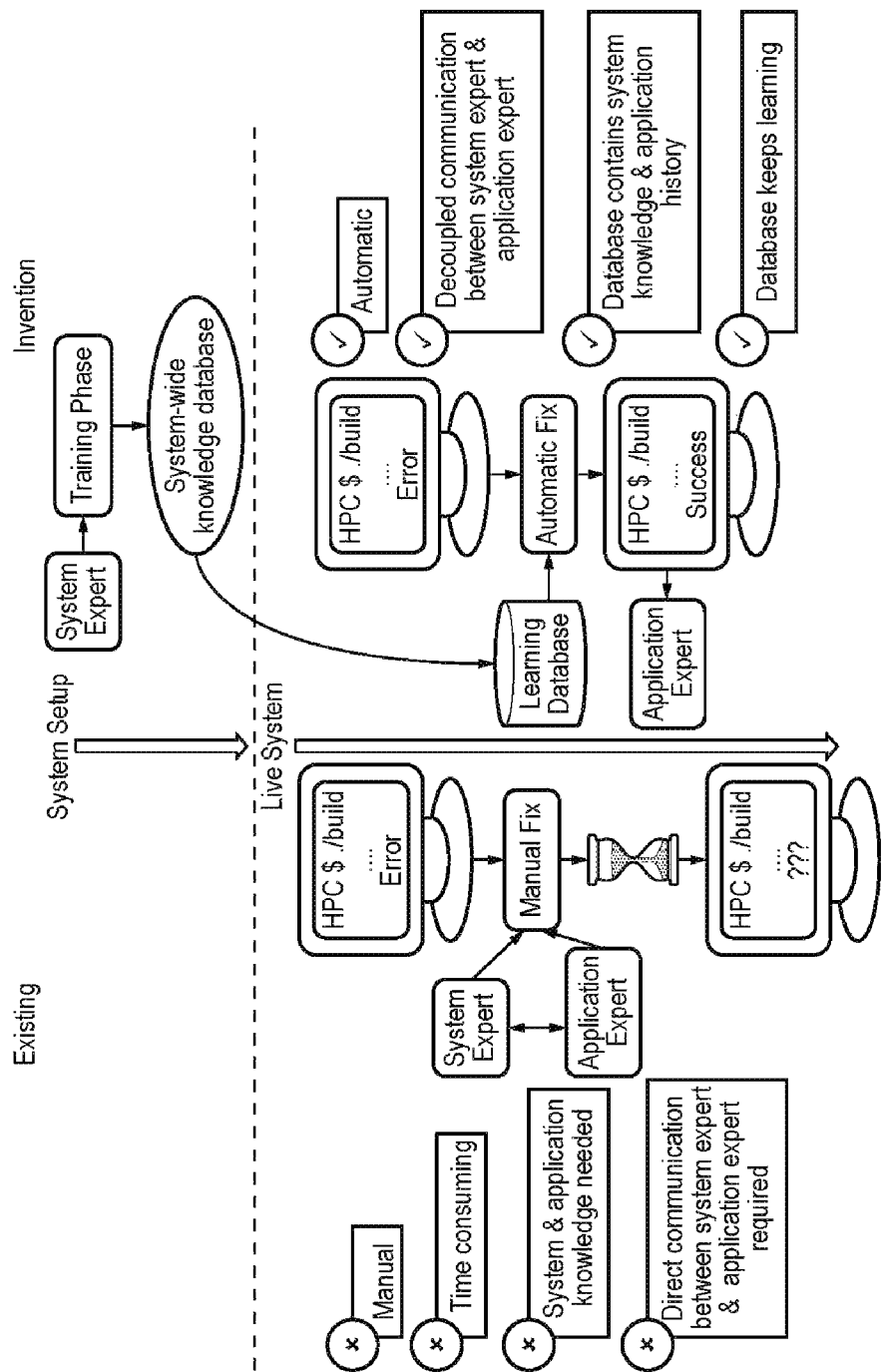
FIG. 4 is a diagrammatic comparison of the prior art and invention embodiments.

FIG. 4 is a high-level comparison of prior art with an invention embodiment. Manually fixing a build error in the prior art involves both a system expert and an application expert. It can be time consuming, and requires direct communication between the application expert and the stem expert.

In contrast, some invention embodiments include a training phase, which can allow offline input in a system set-up phase from the system expert to help provide a system-wide knowledge database. The error database is provided as a learning database used in the live system. If an error is not fixed automatically by use of the database, then the application expert may be consulted. The method is entirely or at least mainly automatic. Communication between the system expert and application expert is decoupled, and the database contains system knowledge and application history and keeps learning.

Figure 5:
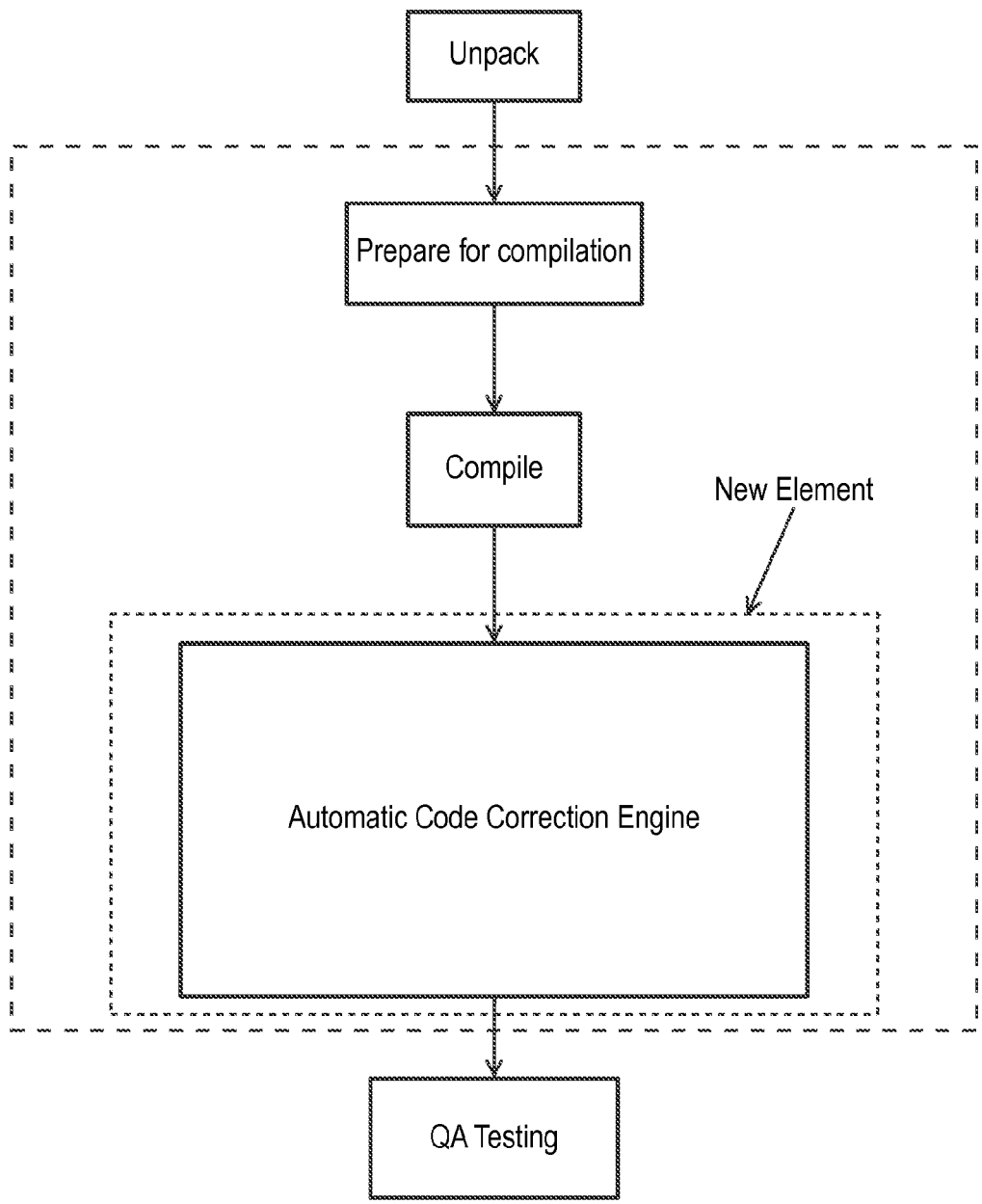
FIG. 5 is a high-level view of an Automatic Code Correction Engine (ACCE)

FIG. 5 shows a high-level view of the Automatic Code Correction Engine (ACCE). The dotted box shows where the ACCE fits within the flow of porting and fixing of compile time error. The engine is essentially a software tool cooperating with a database and consists of a number of features, all combining to provide a means of simplifying the process of porting a piece of software to a new platform.

These features can include:
Identifying and resolving external dependencies.
Identifying and correcting compile errors relating to hardware specific code or function calls.
Architecture specific input/output issues such as correctly selecting big endian or little endian byte ordering.
Pre-processor directive analysis which
Finds directives used in one part of the source code which may solve a compile-time error in other parts,
and identifies any misused directives that may be causing errors.
Recognising errors relating to missing compiler flags through a mapping of errors to compiler flags that solve the error.
Storing errors and their subsequent fixes to provide a database of common compiler (or other toolchain) errors. This learning database is at the heart of the code correction engine. It allows for intelligent use of historical data from all porting performed on the platform to be used to correct compile-time errors for any new applications or libraries.
Deep code inspection which can search for common, or similar, code blocks and encapsulate these into procedures/methods to allow for better code reuse.

Figure 6:
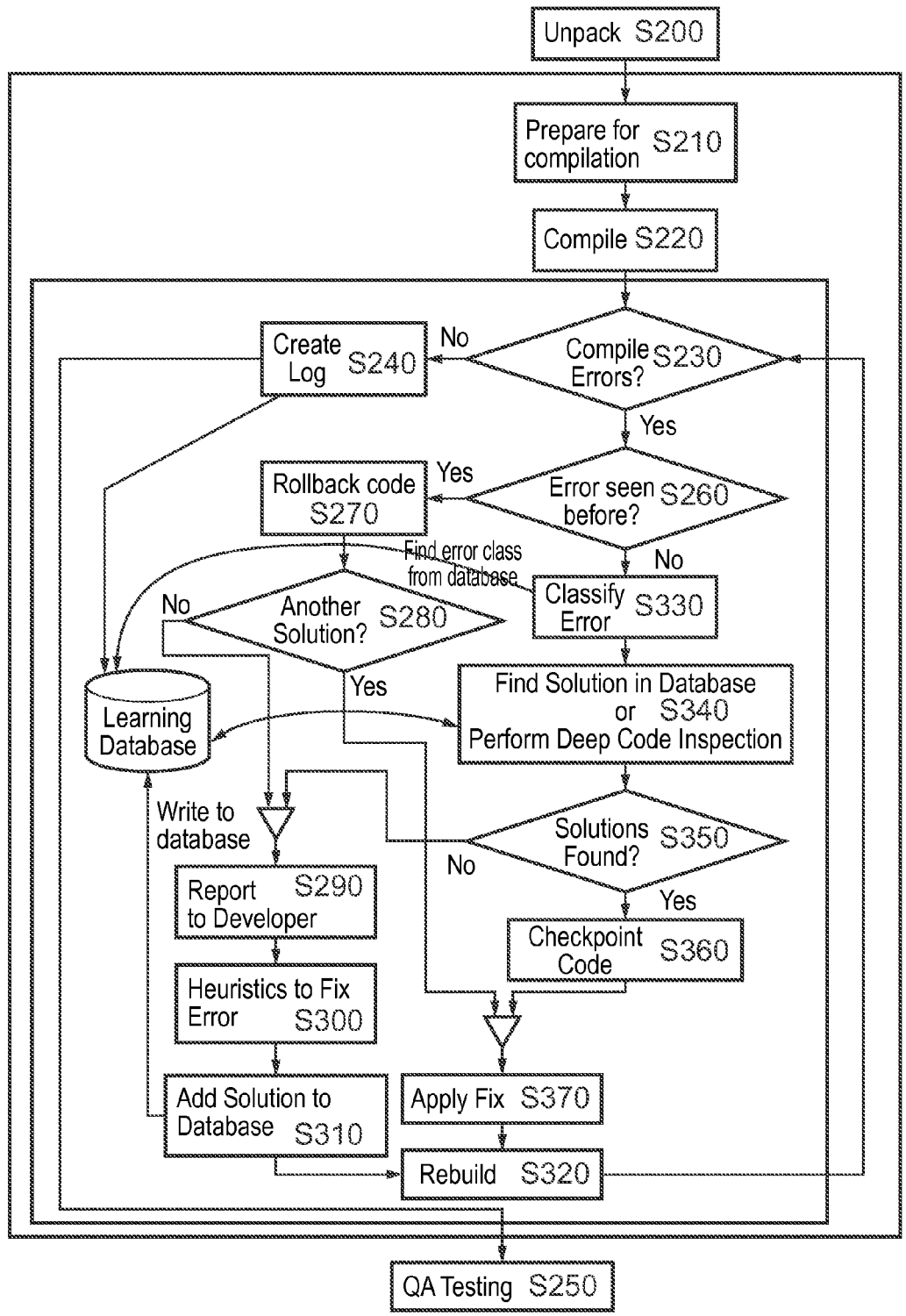
FIG. 6 is a detailed view of the ACCE.

FIG. 6 shows a detailed flow of the Automatic Code Correction Engine. The tool can be triggered when an application or library that is being ported to a new system encounters a build error. This may be an error at the pre-processing stage, compile stage or link stage or any other stage of the build process.

The fragment of code with the error and its associated error message is parsed and analyzed by the engine. From this the error can be classified by searching for similar errors in the database. Searching the database can allow classification of the error and classification can also allows refinement of the possible solutions found. The error classes are divided so as to identify and separate pre-process, compile-time and link-time errors with a further subdivision on the type of error—for example, the compile-time error class could include errors from incorrect compiler flags, invalid variable typing or mismatch between function arguments. These classes can be derived through the error message and code analysis as well as from the compiler error codes and diagnostic messages that are often documented in manuals that accompany the compiler.

Using the structure of the database, described in more detail later, some invention embodiments can find a solution to the error using any or all of three methods:

Performing a direct search of the database, for example, using the database fields and error classes described above as search keys. If a direct match is found in the database, that solution is used.

Using automatic deep code inspection to analyse other parts of the same application to find a solution that was applied elsewhere in the code. This method covers a very common scenario encountered when porting an application to a new system where there are multiple instances of the same porting error in the code. Upon fixing the first error (manually or automatically) and adding the solution to the database, all of the remaining errors can be fixed automatically using this information.

Using automatic deep code inspection of code fragments from other applications that are stored in the database. The solution to any closely matching source code fragment found is applied to solve the error. The analysis of the other application code is carried out in advance: i.e. as previous errors were encountered, or during the training phase of the learning database.

In some embodiments, if no direct solution to the error is found (using direct searching) the tool attempts to solve the error by automatically adapting a similar solution from the same application, or subsequently a different application or system.

When solutions are found in the database, they can be prioritized based on their relevancy to the error and/or a score of the effectiveness of each solution for the given platform for example or runtime environment. A checkpoint of the code and its state is then made before applying the solution with highest priority and rebuilding the application.

In this embodiment, there are two ways in which the priority score may be evaluated:

Effectiveness of solution on given platform.
This gives priority to solutions that have worked previously for the system. For each solution on each system, a score is incremented when it is used successfully to solve an error on the system. The higher the score the more likely it will be used. For this, an extra field is needed in the database to track the score for the solution on the system.
Used for "direct search of database" functionality to prioritise the order in which different solutions are applied.
Used for "adapting a similar solution" functionality when no solution has been found from "direct search" or "deep code inspection" again to try to apply the most likely solutions first.
2. Relevancy to the error.
Solutions whose error details match closest to the error encountered will be tried first. Priority based on relevancy to the error is inherent in the way the solution finding algorithms work, as described below.
For "deep code inspection" priority is given to the solution of the error whose source code signature matches on the most levels of scope to the error encountered.
For "direct search of database" the set of possible solutions are filtered based on the details of their errors (error code, error message, compiler type & flags etc. ... )

If the same error occurs after rebuilding the application the code can be rolled back to its previous state allowing the next solution to be tried. If a different error occurs, this could be either related to the applied solution in which case it can be rolled back as above or it could be an error from further along in the build process in which case another iteration of the error analysis and database search is carried out.

This process may continue until the application builds successfully without error. At this point the code is ready for QA testing, installation and usage.

Throughout the use of the Automatic Code Correction Engine, a report detailing the steps taken at each stage may be made for the developer. This can either be interactive, allowing the developer to control what steps are taken or can be in the form of logs allowing the tool to run fully automatically.

FIG. 6 is a detailed view of one way the automatic code correction engine can function. In step S200 the code is unpacked and in step S210 the code is prepared for compilation. In step S220 the code is compiled and if there are no compile errors in query S230, a log is created in S240 and information transferred to the learning database. The process ends with quality assurance testing in step S250.

If compile errors are detected, there is first a check in step S260 to see if the error has been seen before. This may happen for example if the procedure is returning from a loop of trying a code modification. If the error has been seen before, then the code is rolled back in step S270 (to a pre-modification state) and there is a query in step S280 whether another solution is available. If not there is a report to the developer in step S290 who applies heuristics to fix the error in step S300 and the solution is added to the database in step S310.

Thus in a variant of some invention embodiments, if there is no suitable modification automatically detected, a report is provided for a developer and a manual fix is applied, with the manual fix subsequently being entered either automatically or manually into the database for future use. At that stage there is a code rebuild in step S320 and a loop back to detecting compile errors in the rebuilt code in step S230.

Returning to S260 if the error was not seen before then the error is classified in step S330. The signature may be created at the same stage and the error table for the current build error populated. The error class may be found by comparison with the database. In step S340 a solution is found in the database using the classification or deep code inspection (for example as set out in more detail hereinafter). At this stage as in the previous error classification stage, there is information transfer with the learning database. In query S350 if there are no solutions found the procedure loops to reporting to the developer, fixing the error and adding the solution to the database in steps S290, S300 and S310 with the rebuild and recompilation as before. If solutions are found, a checkpoint is made of the code (and settings, for example including compile settings, libraries and compilers used) in step S360 and a fix is applied in step S370. The code is then rebuilt in step S320 and recompiled.

Three examples of how the Automatic Code Correction Engine works in practice are given in the following paragraphs.

Compile Error Due to Type Mismatch.

Because invention embodiments can capture knowledge of the compiler available on a system, learned during the training phase of the database and continuously updated during the tools usage, they can fix errors related to incorrect or missing compiler flags.

A sample snippet of code that can suffer from a type mismatch error is shown below. The subroutine foo expects 8 byte integers as arguments. The actual arguments at the subroutine call are default integer types, which are 4 bytes for compilers on the SPARC64 IXfx system.

```
$ cat ex1.f90
PROGRAM ex1
    IMPLICIT none
    INTEGER :: x, y
    x = 5
    call foo(x,y)
    print *, x, y
CONTAINS
    SUBROUTINE foo(a, b)
        INTEGER (kind=8), intent(in) :: a
        INTEGER (kind=8), intent(out) :: b
        b = 10 * a
    END SUBROUTINE foo
END PROGRAM ex1
$ gfortran ex1.f90 -64
Ex1.f90: 7.9:
Call foo(x,y)
        1
$
```

As shown above, when the code is compiled with the GNU Fortran compiler on the SPARC64 IXfx system with the command gfortran ex1.f90, the following error occurs: ex1.f90:7.9: call foo (x,y) Error: Type mismatch in argument 'a' at (1); passed INTEGER(4) to INTEGER(8).

At this point the Automatic Code Correction Engine takes over. It classifies the error as a compile-time error, specifically as a subroutine type mismatch error and saves the actual arguments and dummy arguments. A search of the database for this type of error is then carried out and, as it is a common error, it is likely to have been learned by the database. By using the dummy and actual arguments as part of the database search, one of the highest priority solutions to be returned should be to use the -fdefault-integer-8 compiler flag. When the Engine applies this solution the error is corrected and the code builds successfully.

Build Error Due to Incorrect Pre-Processor Flag

A sample code segment is shown below. This employs a common coding/optimization technique where pre-processor conditional compilation directives are used to select between code segments optimized for different architectures—in the case shown below a code segment optimized for the Intel x86 architecture and a generic code segment that will work on any machine.

```
$ cat ex2.c
#define SIZE 2048
void vec_mult( float *a, float *b, float *c, int n) {
#ifdef X86
    /* ASSEMBLY CODE OPTIMISED FOR X86
    ARCHITECTURES */
    ...
#elif GENERIC
    /* SOURCE CODE THAT WILL WORK ON ALL
    ARCHITECTURES */
    ...
endif
    return;
}
int main(void) {
    ...
    vec_mult(a, b ,c, SIZE);
    ...
    return 0;
}
$
```

Compiling with the -DX86 pre-processor conditional compilation flag on a non-x86 based system, such as the SPARC64 IXfx, will result in a build error (the type of error, i.e. compiler error or link error, is dependent on the code in this pre-process region).

The Automatic Code Correction Engine automatically solves this error by looking at the build command for this source file and recognizing that a pre-processor flag was used. The analysis of the source code then extracts the different pre-processor directive values available. Each option is tried in turn as a possible solution to the build error. When the -DGENERIC option is tried the code will build successfully.

Combining the knowledge from the database and pre-processor flag analysis and inspection, ACCE is also capable of resolving errors in applications caused due to pre-process flags or directives.

For example, there may be two compilers, compiler A and compiler B, and the database has learnt that both of these compilers behave similarly.

The code path for the compiler A and compiler B can be controlled by the COMPILER-A and COMPILER-B pre-processor macros respectively. An application has the code snippet shown below that uses the COMPILER-A pre-processor flag macro to so that it works correctly with compiler A.

```
#ifdef COMPILER-A
    /* SOURCE CODE TO WORK WITH COMPILER A */
    ...
#else
    /* GENERIC SOURCE CODE THAT DOES NOT WORK WITH
    COMPILER A */
    ...
endif
```

However, when this application is compiled with compiler B it fails.

To resolve the error, the code correction tool performs an inspection of the pre-processor flags used. It finds COMPILER-A macro. Through the database and knowledge of the compiler tool chain, the tool knows that compiler A and compiler B behave similarly. Therefore, it modifies the code so that compiler B executes the same code path as compiler A as shown below:

```
#ifdef ( COMPILER-A || COMPILER-B )
    /* SOURCE CODE TO WORK WITH COMPILER A OR
    COMPILER B*/
    ...
#else
    /* GENERIC SOURCE CODE THAT DOES NOT WORK WITH
    COMPILER A or B */
    ...
endif
```

Link Error

As the Automatic Code Correction Engine is aware of the tool chain available on the system, it can handle errors caused from external libraries and other dependencies. The sample Makefile shown below gives the build rules for a code that utilizes the FFTW library to perform the discrete Fourier transform (DFT). The location of the FFTW library is hard coded into the build script, in this case pointing to an install for a SPARC64 IXfx system. If this is compiled on an x86 system a link error will result as shown below.

```
$ cat Makefile
CC=$(cc)
CFLAGS=-O3
LIBDIR= -L/opt/fftw/3.3/sparc_ixfx/lib64
LIBS= -lfftw3
EXE=ex3
SRC=ex3.c
OBJ=$(SRC:.c=.o)
.c.o:
        $(CC) $(CFLAGS) -c $<
$(EXE): $(OBJ)
        $(CC) $(CFLAGS) $(LIBDIR) $(LIBS) $(OBJ) -o $@
clean:
        rm -f *.o $(EXE)
$ make
icc -O3 -c ex3.c
icc -O3 -L/opt/fftw/3.3/sparc_ixfx/lib64 -lfftw3    ex3.o -o ex3
ex3.o: In function 'performFFT':
ex3.c:(.text+0x6f): undefined reference to 'fftw_malloc'
ex3.c:(.text+0xa7): undefined reference to 'fftw_plan_dft_1d'
ex3.c:(.text+0x1c1): undefined reference to 'fftw_execute'
```

-continued

```
ex3.c:(.text+0x33c): undefined reference to 'fftw_destroy_plan'
ex3.c:(.text+0x35c): undefined reference to 'fftw_free'
make: *** [ex3] Error 1
$
```

Using the output from the build, the Automatic Code Correction Engine classifies the error as being a link error. By saving and analyzing the error output it can see that the error is specifically related to the FFTW library. In this case one of the solutions suggested from the database should be to check the link command to ensure the correct location of the FFTW library is used. When the engine implements this fix the code will build without error.

Invention embodiments are capable of handling errors resulting from missing, incorrect or corrupt library or supporting files. Since embodiments can store knowledge of the system and tool chain they are able to identify if the missing libraries or files are already available on the system and use these files rather than downloading them. This additional step has major implications in terms of the resulting performance because a library already on the system is more likely to be optimized for the hardware of the system.

Figure 7:
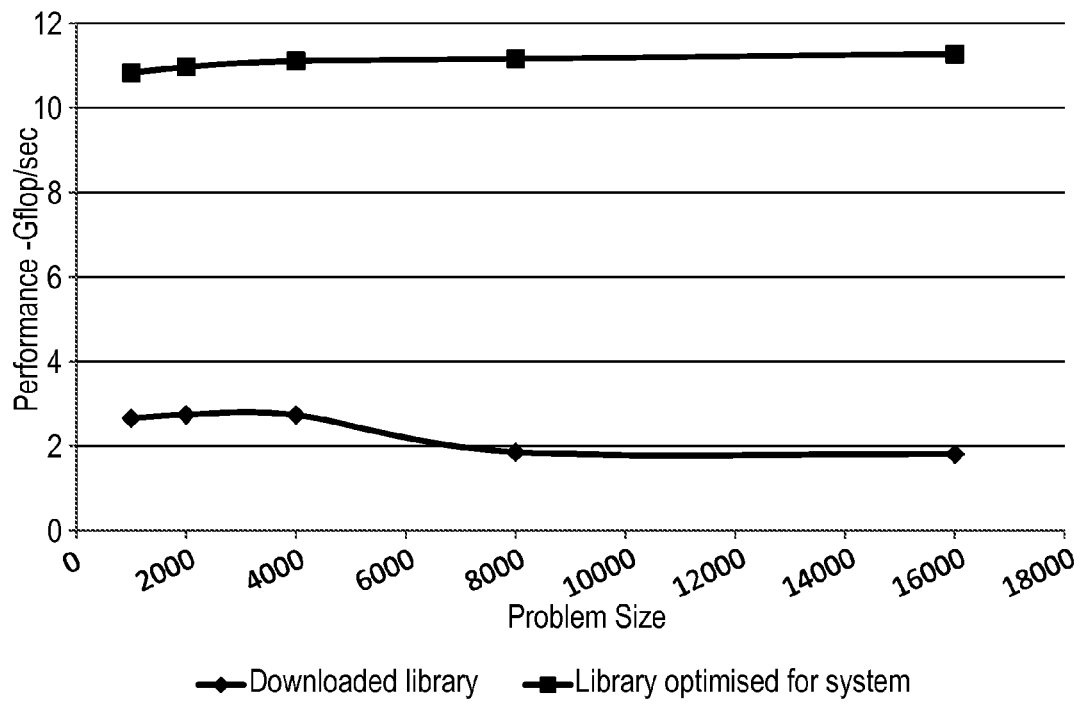
FIG. 7 is a graph comparing library functionality.

This is clearly shown in FIG. 7 where, for a matrix multiplication benchmark, we see that a library already available on the system outperforms a downloaded library by a factor of 5 for all problem sizes. ACCE allows use of the library already on the system before trying to download the missing library.

Other potential features and scenarios where the benefits of invention embodiments are given below:

Deep Code Inspection

Invention embodiments perform automatic deep code inspection to analyze source code fragments within an application or across different applications to identify inconsistencies in an application which is encountering build errors.

Figure 8:
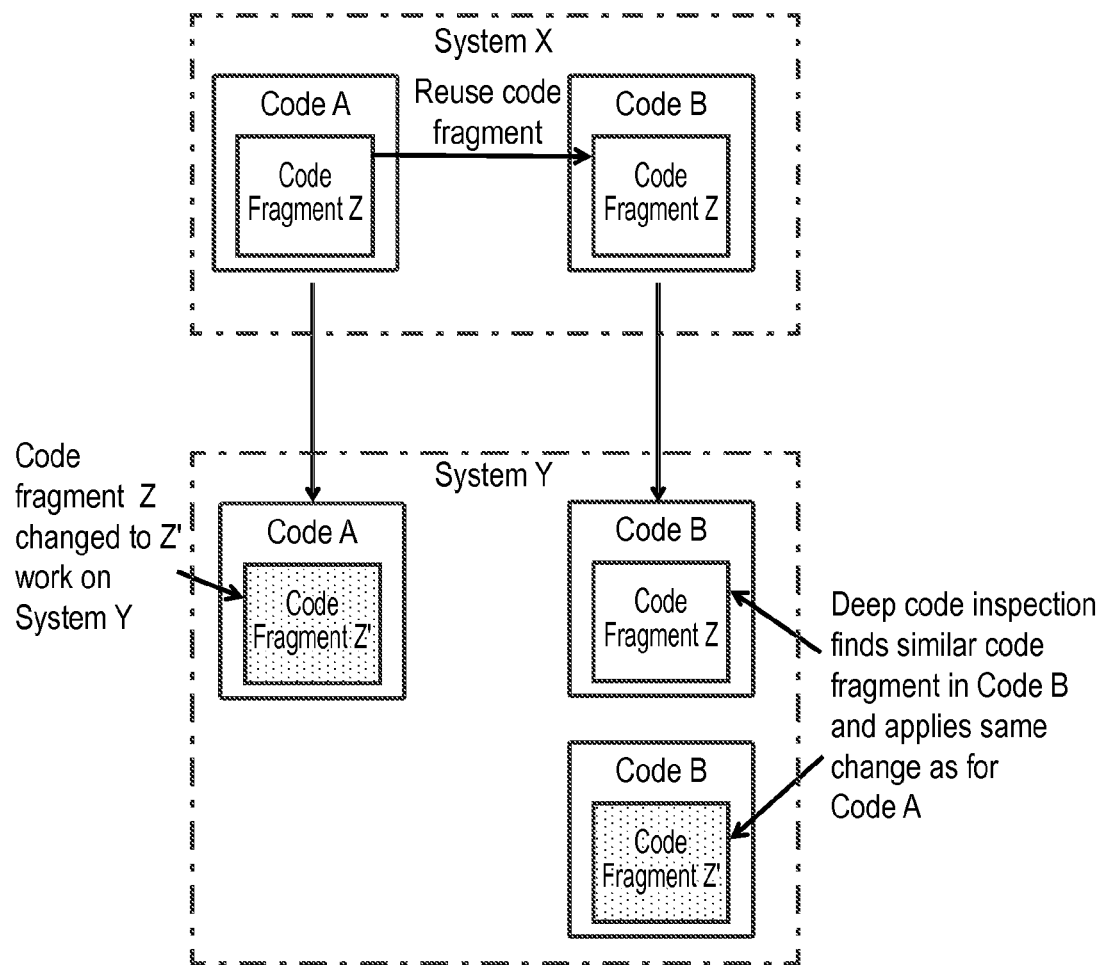
FIG. 8 is a diagram of deep code inspection.

An example of a novel use of this deep code inspection feature is shown in FIG. 8 Here we have two codes, Code A and Code B. Code B reuses a code fragment (Code Fragment Z) from Code A. Both of the codes work on System X. When Code A was ported to another system, System Y, it was necessary to modify this code fragment (now Code Fragment Z') to get Code A working correctly on the system.

Because the database stores source code and the modifications needed to get the code working correctly on each system, when Code B is ported to System Y, the deep code inspection finds the same Code Fragment Z in Code B as was in Code A. The same modifications applied to get Code B working on System Y, replacing Code Fragment Z with Code Fragment Z', can then be applied to get Code B working on System Y.

Awareness of Tool Chains of System

Certain errors are not resolvable without contextual information about the tool chain and compilers available on a system. Invention embodiments can use tight integration with the tool chain and develop an in depth knowledge of compiler to enhance error correction.

Moving to New, Unknown System

When moving to a new system, the ever increasing training set is run on the new system and the learning database of solutions is automatically adapted to the new system.

The database and tool is then able to resolve application build errors already seen on other systems on this new system.

Moving Application to Untested System

If the tool has knowledge of an application A on system X and knowledge of applications B, C, D, . . . on system Y then it can be used to automatically fix errors for application A on system Y.

Direct Search of the Database

The direct search of the database can work by using an iterative filtering process of all the possible solutions stored in the database to find a subset of solutions which are applicable to the build error encountered by the application.

Figure 9:
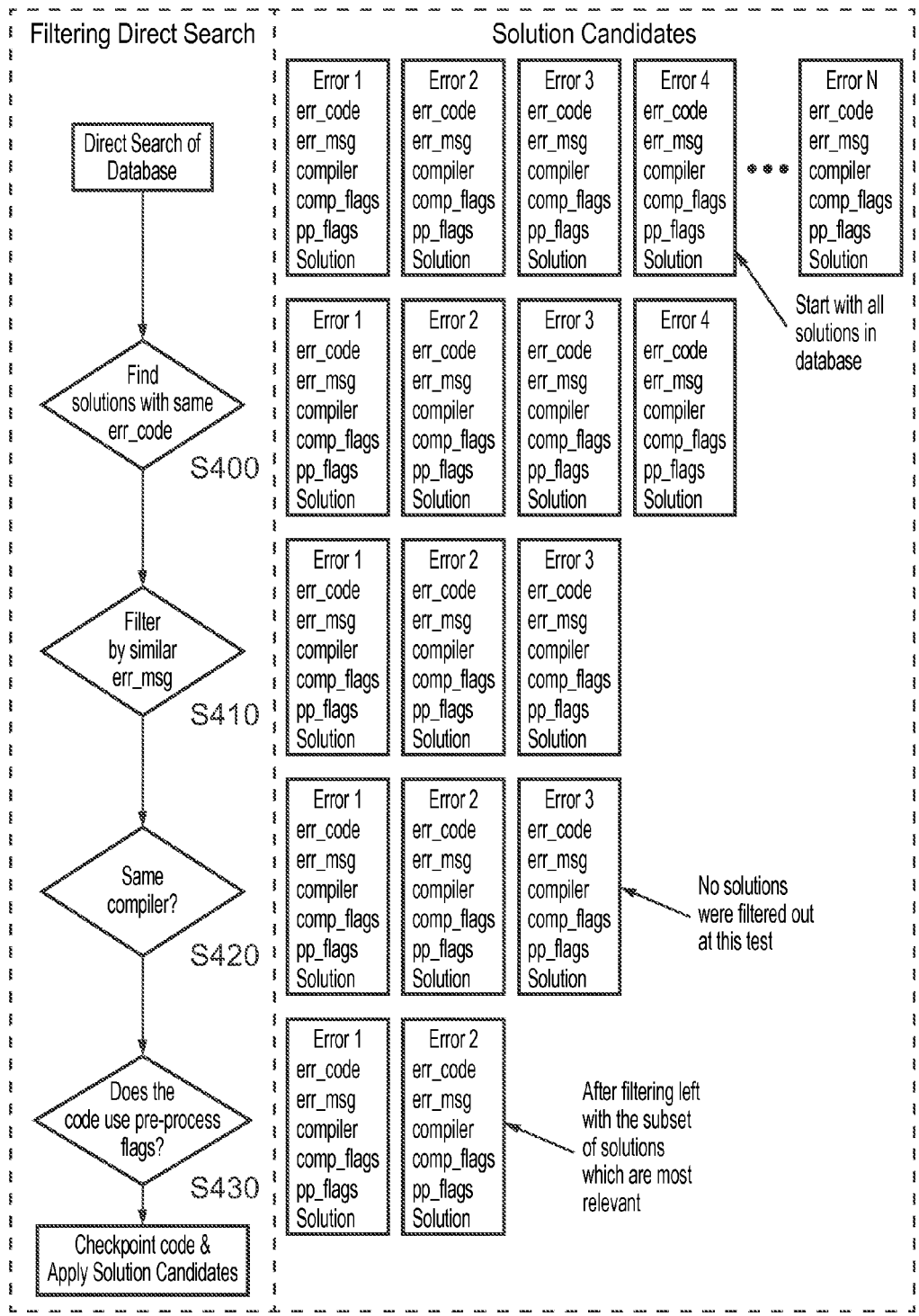
FIG. 9 is a flowchart showing a direct search of the error database.

At the start of the process all solutions stored in the database are eligible as candidates to solve the given build error. Then each of the information items extracted when an error occurs—e.g. error code; error message, compiler type, compiler flags, pre-process flags, loaded libraries and environment variables—is compared with the same information stored in the database (as database fields) to reduce the number of solution candidates. At the end of this process each remaining solution candidate is applied. The order in which solutions are applied is prioritized based on the score of the effectiveness for each solution. FIG. 9 illustrates how the direct search of the database works. In a first step S400, solutions are found with the same error code. In step S410 all the solutions found in the previous set up are filtered by the error message. In step S420, k only solutions from the same compiler are retained (no solutions are filtered out). In step S430 only solutions with the same pre-process flags are retained. Two candidate solutions remain. They will be tried in turn.

FIG. 9 omits a first possible step of filtering according to error classification. This first step is an especially useful filter. The tool and the direct search functionality can work without classification but it may be less efficient and take longer to find the solution.

Deep Code Inspection

When a build error occurs, the source code fragment of the application around the error can also be stored in the database (along with other information to capture error characteristics and the compiler and system environment).

Figure 10:
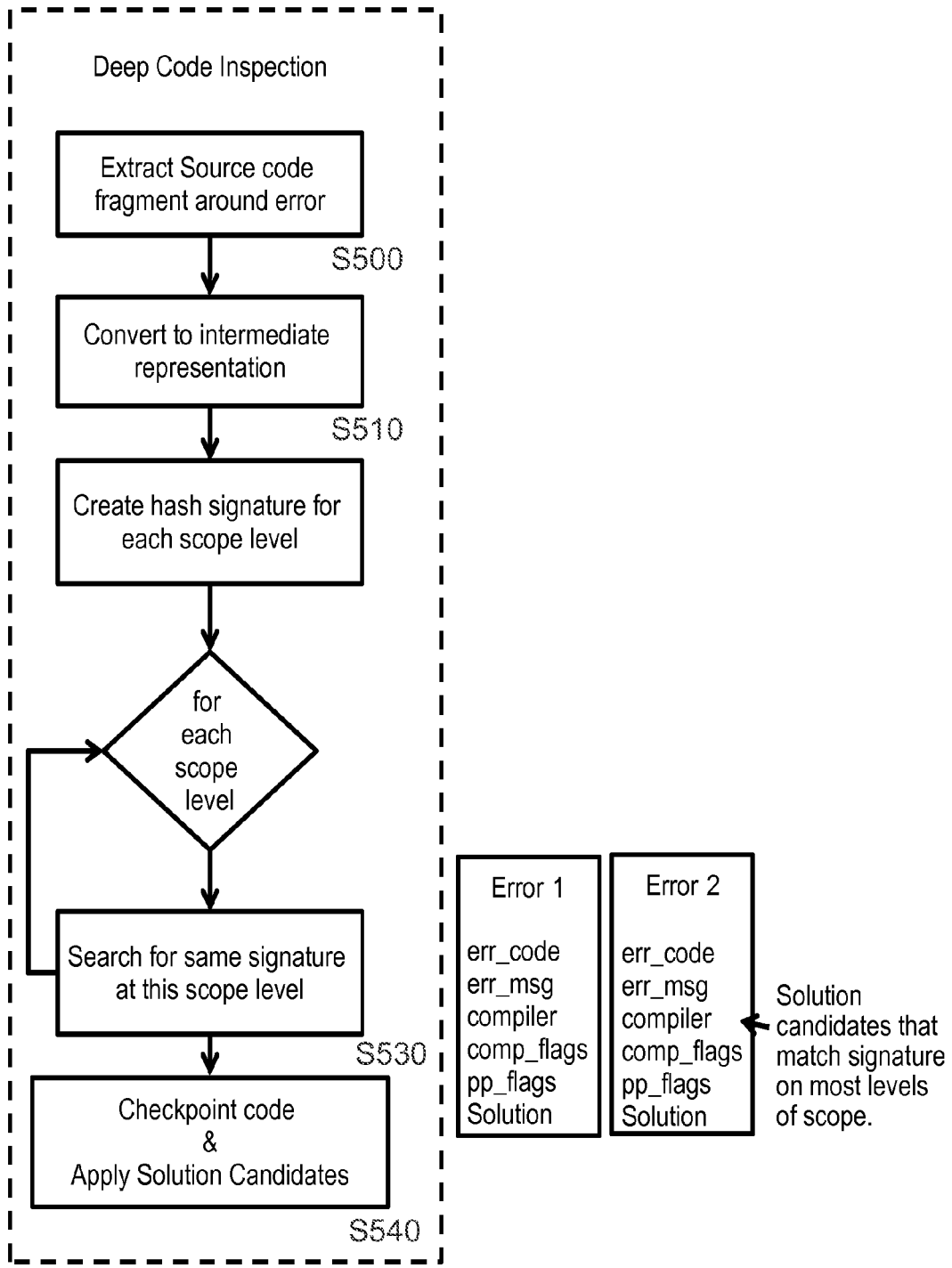
FIG. 10 is a flowchart of a signature comparison with the database.

Deep code inspection works by the following process (as shown in FIG. 10):

In step S500, the source code fragment around the error is extracted.

The code fragment is converted to an unambiguous intermediate representation (S510). This turns source code, variables and function names into a non language or programming-style specific representation.

From this a signature (or hash value) is created for each scope level (e.g. source file, procedure, loop) available in the code fragment (S520). This allows multiple levels of comparison to be done, so that solutions candidates to be filtered depending on how closely it matches each of the signatures for the code fragment.

Working from the innermost scope level outwards, the signature for the code fragment at each scope level is compared to signatures from the database at a similar scoping level (S530). The solutions which match most levels of scope are then applied to try to correct the build error.

Finally a checkpoint of the code is made and solution candidates are applied in step S540.

Scope here includes all the blocks of the program, working from the innermost block to the outermost, where the code is accessible.

An example piece of source code that shows the different scope levels around an error is shown in the source code below.

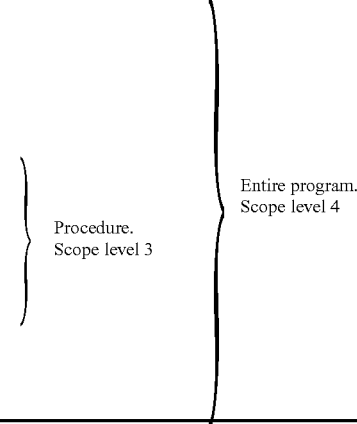

In invention embodiments, a hash signature may be created for every error encountered and entered into the database error table. Even if a particular error does not use deep code inspection to find a solution, creating the signature allows for future errors that do utilize deep code inspection to be able to search through these errors.

In addition to creating signatures at each scope level of the intermediate representation, a context signature for the source file is created and stored. This allows the solution of errors where the exact same source file has been seen and corrected before.

As an example, the table below shows the contents of the error table in the database for the compiler error example described as the first example of how the ACCE can work in practice.

| Field Name | Contents |
|---|---|
| Error class | Compiler error, subroutine type mismatch |
| Error code | jwd2204i-s |

-continued

| Field Name | | Contents |
|---|---|---|
| Error message | | ex1.f90:7.9: call foo(x,y) Error: Type mismatch in argument 'a' at (1); passed INTEGER(4) to INTEGER(8) |
| Compiler | | gfortran, GNU Fortran (GCC) 4.4.4 |
| Pre-processor flags used | | none specified |
| Compiler flags used | | none specified, default values |
| Hash signatures | Context | 71d10c85643819a87fea170da5013e4366a1bc1e |
| | Scope level 1 | 42eba1bc25dc9fc76601ba99d82685f255180caa |
| | Scope level 2 | 21d9da9416343cae6ba2c76eb65a9a4bbbae9323 |
| | Scope level 3 | 2bd11113e5235792a6f63f9cf47fc4b5b259525b |
| Solution | | Compile with -fdefault-integer-8 |

To get the hash signatures firstly the various scope levels of the error are determined. The scope levels for the same example of compile error due to type mismatch are shown below.

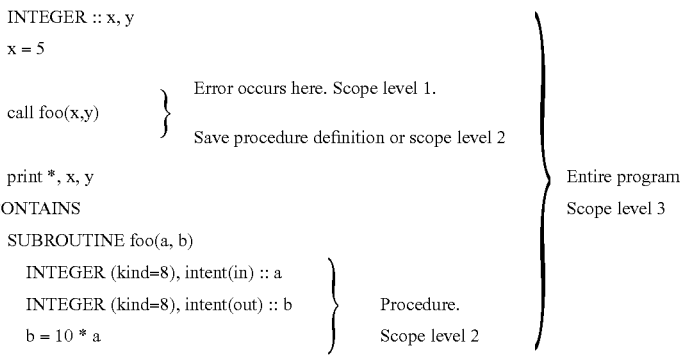

The source code is then converted to a non-language specific intermediate representation as shown below.

```
START PROGRAM
    INTEGER i1 = 5
    call s1(INTEGER i1, INTEGER i2) } Scope level 1
    WRITE(STDOUT,DEFAULT FORMAT) INTEGER i1, INTEGER i2
CONTAINS                                                              } Scope level 3
    START PROCEDURE s1(INTERGER*8 i3, INTEGER*8 i4)
        INTEGER*8 i4 = 10 * INTEGER*8 i3           } Scope level 2
    END PROCEDURE s1
END PROGRAM
```

Using the intermediate representation code the hash signature is generated for each of the scope levels identified. A standard hash function can be used to generate the signature (the SHA-1 function is used for the examples below) which gives the codes to add to the table:

Hash Signature for Scope Level 1:

HashFunction( call s1(INTEGER i1, INTEGER i2) )
=> 42eba1bc25dc9fc76601ba99d82685f255180caa Hash Signature for Scope Level 2:

HashFunction(
START PROCEDURE s1(INTERGER*8 i3, INTEGER*8 i4)
    INTEGER*8 i4 = 10 * INTEGER*8 i3
END PROCEDURE s1
)

21d9da9416343cae6ba2c76eb65a9a4bbbae9323

Hash Signature for Scope Level 3:

HashFunction(
START PROGRAM
    INTEGER i1 = 5
    call s1 (INTEGER i1, INTEGER i2)
    WRITE (STDOUT, DEFAULT FORMAT) INTEGER i1, INTEGER i2
CONTAINS
    START PROCEDURE s1 (INTEGER*8 i3, INTEGER*8 i4)
        INTEGER*8 i4 = 10 * INTEGER*8 i3
    END PROCEDURE s1
END PROGRAM
)
=>
2bd11113e5235792a6f63f9cf47fc4b5b259525b Hash Signature for Full Source File (Context Hash):
A hash signature for the full source file containing the error is also created. This is called a context signature. The context signature for the example code is shown below.

```
HashFunction(
  PROGRAM ex1
    IMPLICIT none
    INTEGER :: x, y
    x = 5
    call foo (x,y)
    print *, x, y
  CONTAINS
    SUBROUTINE foo (a, b)
      INTEGER (kind=8), intent (in) :: a
      INTEGER (kind=8), intent (out) :: b
      b = 10 * a
    END SUBROUTINE foo
  END PROGRAM ex1
)
=> 71d10c85643819a87fea170da5013e4366a1bc1e
```

The learning database is a key component for the Automatic Code Correction Engine. Its design and layout allow for the tool to develop a porting knowledgebase and expert system across a whole platform that can automatically correct build errors for new applications not previously tested on that platform.

The database can be structured so that when an error occurs, information about the error itself and the state of the compiler and system environment at the time of the error is saved. This information can include:

Details about the hardware and software stack of the platform.

The error code from the compiler.

Compiler version.

Compiler flags.

Pre-processor macros.

Loaded libraries and path environment variables.

Fragment of source code containing the error.

The subsequent fix for the error such as source code patches, modified build instructions or a series of commands or scripts to execute. A grading and priority of the effectiveness of each solution may also be stored.

Figure 11:
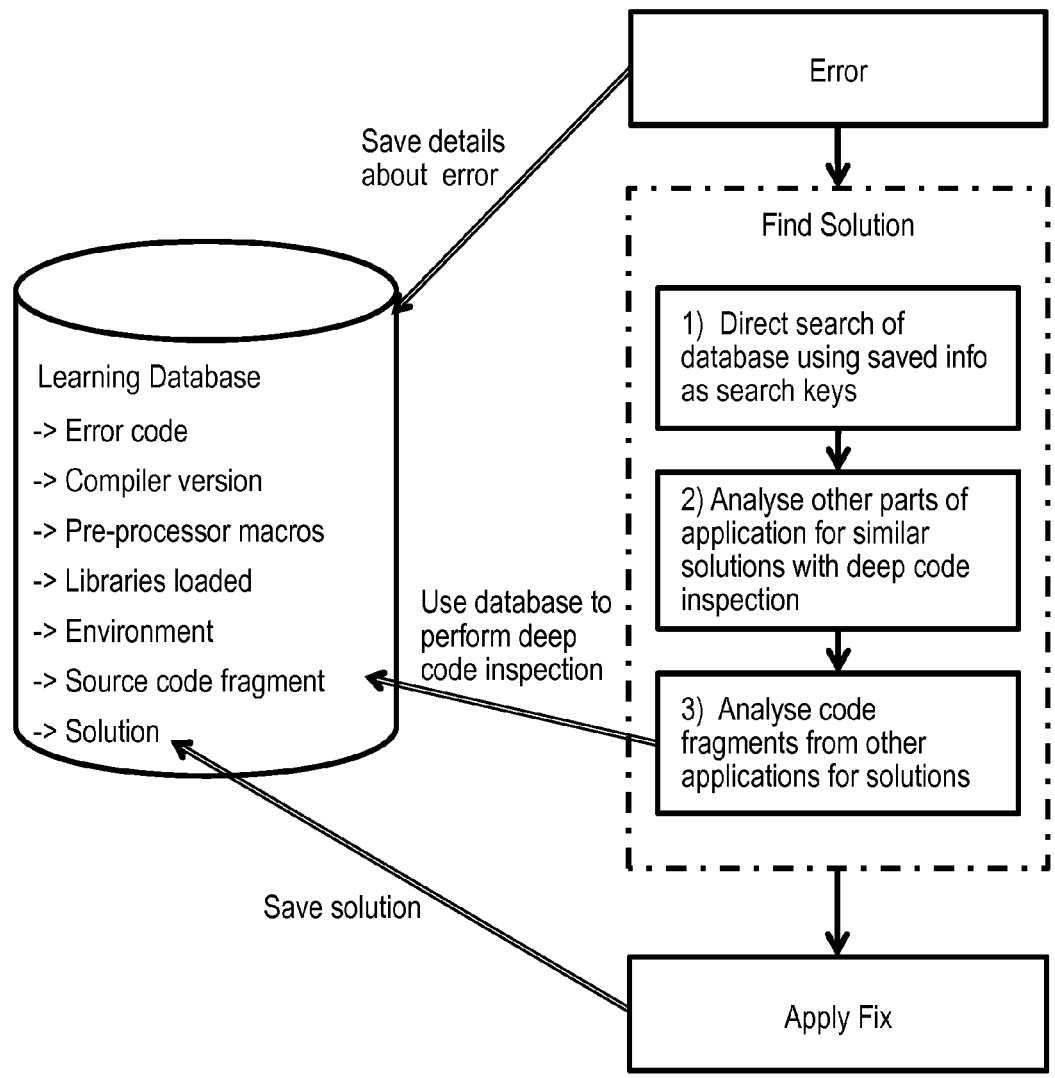
FIG. 11 is a pictorial representation of the learning database and its relation to ACCE/methods of invention embodiments.

These items will provide sufficient information in classifying and finding similar errors for different applications within the database. FIG. 11 illustrates information stored in the database when an application encounters a build error and the steps performed to find possible solutions to the error.

Details of the error are saved to the learning database as shown. The engine applies a direct search using the saved error details, and analyses other parts of the application for similar solution using deep code inspection. No interaction with the database need take place at this stage. This functionality allows the solution of the multiple occurrences of the same error within the same application without needing a lookup of the database for each error. It works with the following steps:

Step A—Find first instance of Bug A

Step B—Fix Bug A

Step C—Look for additional instances of Bug A in the application

Step D—Fix these also

Once a fix has been found, this is saved to the database along with the error details.

Figure 12:
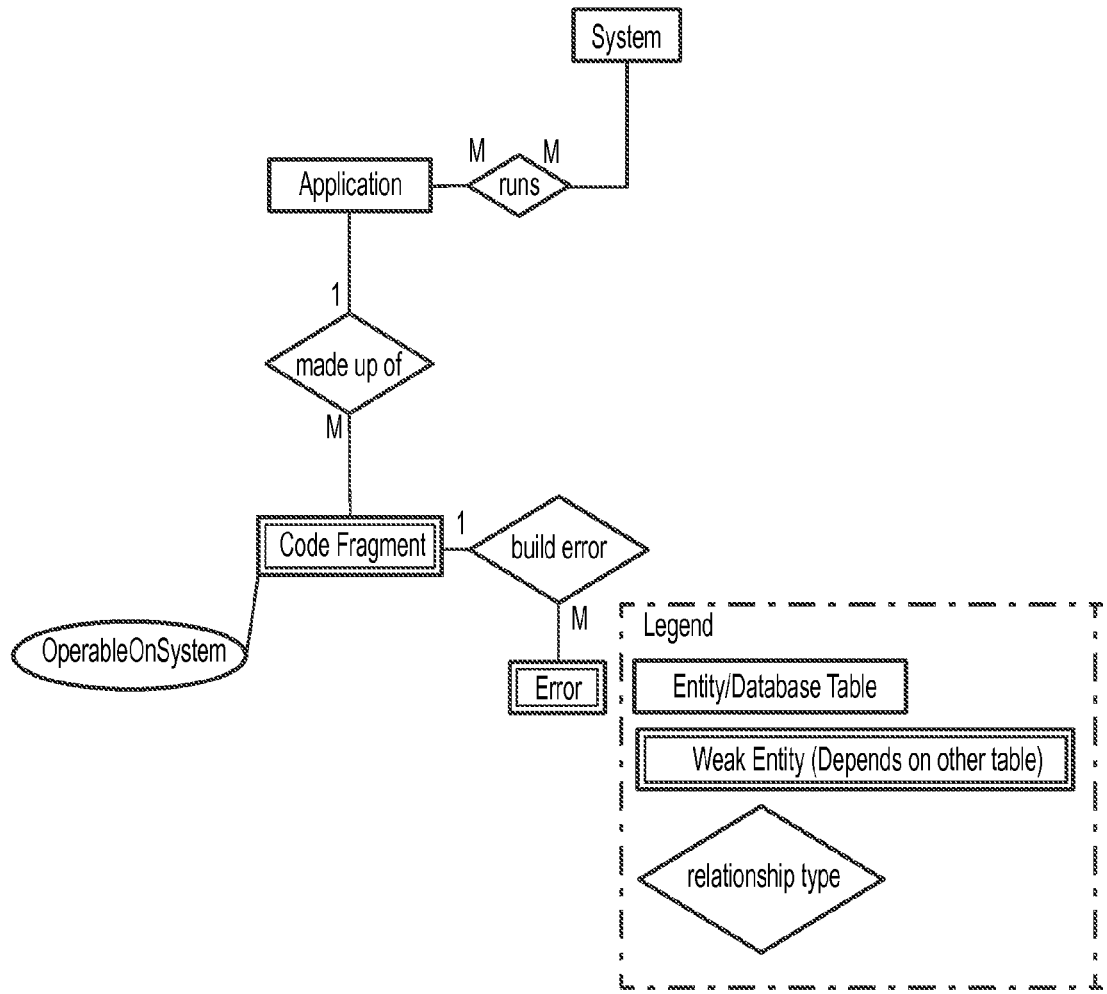
FIG. 12 is an entity relationship diagram for the learning database.

FIG. 12 shows the relations between the various entities/tables of the learning database. These relations allow the Automatic Code Correction to easily implement both its direct search of errors in application code and deep code inspection functionality completely:

The System table stores information about the computing systems on which the Automatic Code Correction Engine operates—architecture details, software environment. For example, this table contains information on the hardware of the system (CPU specs, memory, interconnect details) and details about the environment and software of the system such as operating system details and OS tuning parameters and settings, services enabled to run on the system, the packages and libraries installed on the system, details of compilers available on the system (compiler family, version number). From this complier information it is possible to gauge the level of similarity between different compilers on the same system and across different systems. The most obvious level of similarity is for compilers from the same family (e.g. Intel, GNU, Fujitsu) or the exact same compiler on different systems. For compilers from different families there may still be some similarity between different parts of the compiler such as the tokenizer and parser in the front-end of the compiler or code generators in the back-end. There should be fields in the "system" table to hold this information. These fields are populated either by patterns obtained from the training dataset or from user supplied information about the compiler.

The application table holds high-level details about each application codes being built on the system, such as dependencies for the code. This is related to the Code Fragment table which stores extracted parts of the application code that were used by the Automatic Code Correction Engine.

The Code Fragment table also includes a field/attribute called OperableOnSystem which indentifies if the Code Fragment could be build successfully on each system. In the case where a code fragment did not work on a particular system, an entry in the Error table is created for that code fragment.

The Error table then stores the error code, error message, compiler, library and other environment settings when the code fragment fails to build on a given system. This table also contains a solution field where the set of steps needed to make the code fragment work on the system are stored.

This allows a search through the build errors in similar code fragments (by the automatic deep code inspection process described shown in 10) to find solutions which may be applicable to new build errors without a solution.

The database can be populated in two ways. Primarily, it can learn details of the computing system as it is used. This includes gaining knowledge of the compilers, libraries and other parts of the system tool chain available and learning from the build errors of new and existing applications on the system.

There can also be a training phase that allows the database to develop an awareness of the type of build errors and the format of error messages. This takes the form of a training code suite that is run automatically. It presents code with known errors to the computing system. The resulting error messages and output can then be associated with the particular error class and stored in the database, along with a solution for the error.

Figure 13:
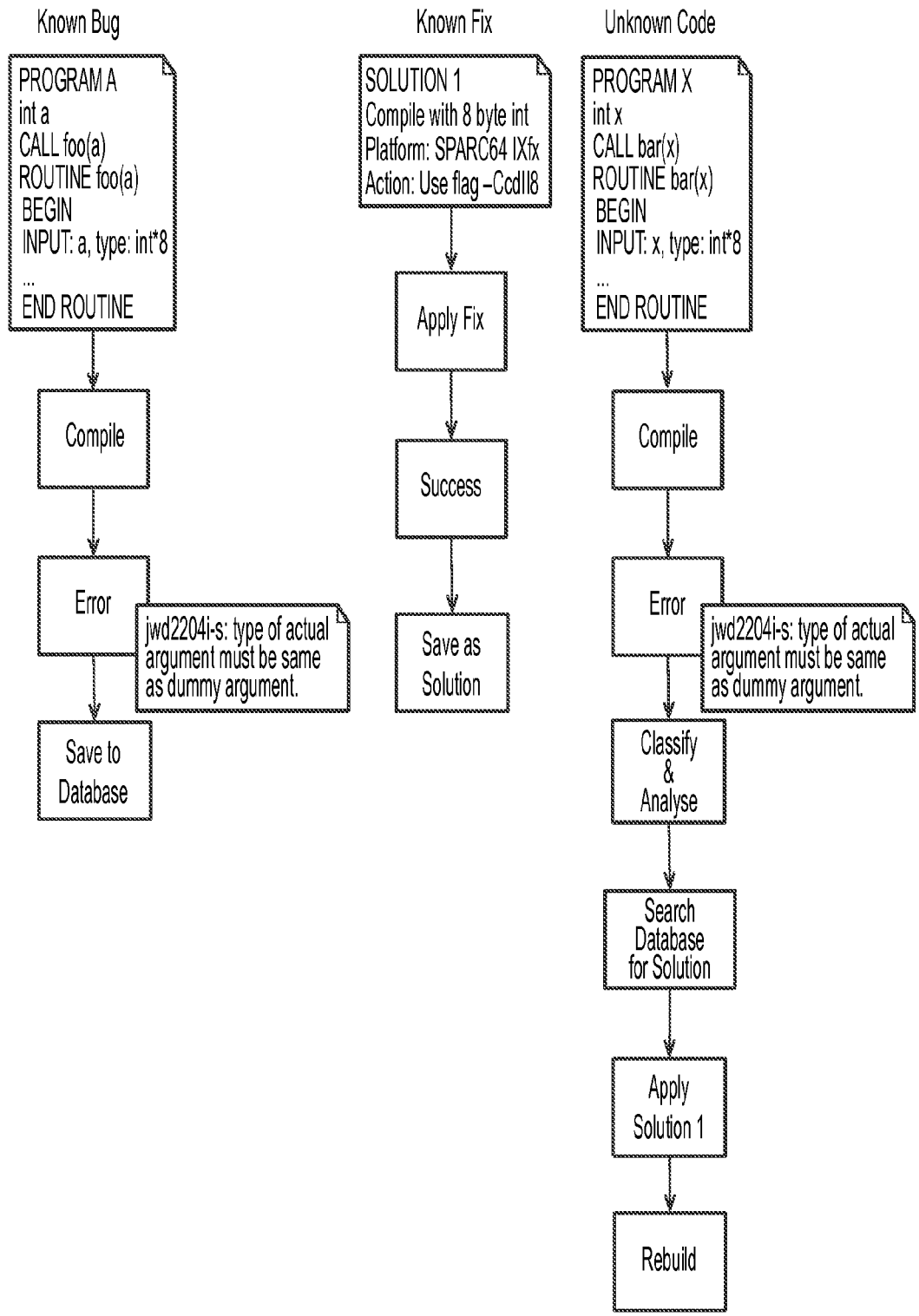
FIG. 13 illustrates a training phase for an automatic code correction database.

FIG. 13 shows an example of the training phase for a type mismatch error on a SPARC64 IXfx system. First, a code with a known bug is compiled on the system. The resulting error message for the code is saved to the database. A known fix for the error is then applied and saved as a solution for this type of build error. Subsequent code that produces a similar error message can then utilize this fix as a possible solution.

The training phase described above is used to populate the database with errors classes and solutions.

Moreover, because the database stores source code fragments for all errors seen, these are added to the training set for the database and are used when moving to a new system.

The Automatic Code Correction Engine can speed up and automate the porting process, making it easier and faster to port an application to a variety of platforms. It can ease the burden on the application developer, the domain expert, who may not be familiar with the system and on system administrators unfamiliar with the application.

Moreover, as this tool makes it easier to run an application on a variety of platforms, it can help the application developer identify any bugs in the code. This helps to increase confidence in the quality and robustness of the application. By combining this ease of porting with the historical information stored in the database, the tool can become an integral part of the software product lifecycle.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-executed method of porting source code for use in a runtime environment including a tool chain with a compiler for building the source code, the method comprising:
    obtaining a source code fragment associated with a build error during a source code build in the runtime environment;
    creating a signature of the source code fragment;
    automatically comparing the signature with entries in an error database constructed from a history of previous build errors in the runtime environment and fixes in a form of one of source code and tool chain modifications to produce a comparison;
    using the comparison to find one or more similar previous build errors to the build error and identify one or more of the source code and tool chain modifications as candidate solutions to the build error;
    compiling the source code with each of candidate source code and tool chain modifications in turn until the source code compiles without reproducing the build error; and
    storing the build error in the error database and storing the modification with which the source code compiles without reproducing the build error as a fix,
    wherein candidate solutions are prioritized according to one of an effectiveness of the fix in the current run time environment and relevancy of the error, and
    wherein the relevancy of the error is based on a degree to which the signature in the previous build error matches the signature of the source code fragment.

2. A method according to claim 1, wherein the signature of the source code fragment is created by converting the source code fragment to a non-language specific representation, and creating another signature from an intermediate representation as, a hash signature.

3. A method according to claim 1, wherein the signature of the source code fragment includes a scope level signature for each of a plurality of scope levels around the error.

4. A method according to claim 1, wherein an initial learning phase is executed, allowing a training set of build errors and known solutions to be established in the database.

5. A method according to claim 1, wherein the effectiveness of the fix is based on a score which is incremented each time the fix is used successfully to solve a build error.

6. A method according to claim 1, wherein the error database stores build errors including build errors in different runtime environments and source code of different applications.

7. A method according to claim 1, in which build error fields in the error database include an error message and one or more of fragment signatures, an error classification, runtime environment details, and application details, and in which the build error is compared with one of any and all of the build error database fields.

8. A method according to claim 7, wherein error classes are divided to identify and separate pre-process, compile-time and link-time errors, with a further subdivision as to type of error.

9. A method according to claim 7, wherein the error class is assigned based on the error message, source code analysis and any error code and diagnostic message provided.

10. A method according to claim 7, wherein the relevancy of the error includes determination of a degree to which database fields of a similar previous build error match the build error.

11. A method according to claim 1, further comprising:
    obtaining an error message when the source code fragment is obtained, classifying the error message when the signature of the source code fragment is created, and automatically comparing the error message classification with the entries in the error database, before comparison of the signature with the entries in the database.

12. A method according to claim 1, wherein one of entries in the error database and previous build errors from a same application as the source code are compared with the signature first, and if no fixes are found, entries in the error database of previous build errors from any other application are compared with the signature.

13. An apparatus comprising a processor and a memory arranged to correct errors in porting source code for use by with a new runtime environment of the memory including a tool chain with a compiler for building the source code by the processor, the apparatus comprising:
    the processor and the memory;
    an input arranged to obtain a source code fragment associated with a build error during source code build in the environment;
    a signature creator arranged to create a signature of the source code fragment
    an error database constructed from a history of previous build errors in the environment and their fixes in the form of one of source code and software configuration modifications
    a comparator arranged to automatically compare the source code signature with entries in the error database and produce a comparison;
    an identifier arranged to use the comparison to find one or more similar previous build errors to the build error and identify one or more of the source code and software configuration modifications as candidate solutions to the build error, the candidate solutions being prioritized according to one of an effectiveness of the fix in the current run time environment and relevancy of the error, and the relevancy of the error being based on a degree to which the signature in the previous build error matches the signature of the source code fragment;
    a loop inputter arranged to allow compilation of the source code with each of the identified source code and software configuration modifications in turn until the source code compiles without reproducing the build error; and
    a database updater arranged to store the build error in the error database, and the modification with which the source code compiles without reproducing the build error as a fix.

14. An apparatus according to claim 13, wherein the database comprises a system table storing information about the runtime environment, an application table storing details about application codes built, a code fragment table storing code fragments and an indication of whether the fragments can be successfully built and an error table storing previous build errors.

15. A computer-executed method of porting source code for use in a runtime environment including a tool chain with a compiler for building the source code, the method comprising:

obtaining an error message and a source code fragment associated with a build error during source code build in the runtime environment;

classifying the error message producing an error message classification;

automatically comparing the error message classification with entries in an error database constructed from a history of previous build errors in the runtime environment and fixes in a form of source code and tool chain modifications to produce a comparison;

using the comparison to find one or more similar previous build errors to the build error and identify one or more of the source code and tool chain modifications as candidate solutions to the build error, the candidate solutions being prioritized according to one of an effectiveness of the fix in the current run time environment and relevancy of the error, and the relevancy of the error is based on a degree to which database fields of a similar previous build error match the build error;

compiling the source code with one of each of candidate source code and tool chain modifications in turn until the source code compiles without reproducing the build error; and storing the build error in the error database and storing the modification with which the source code compiles without reproducing the build error as a fix.

\* \* \* \* \*